Patented June 19, 1951

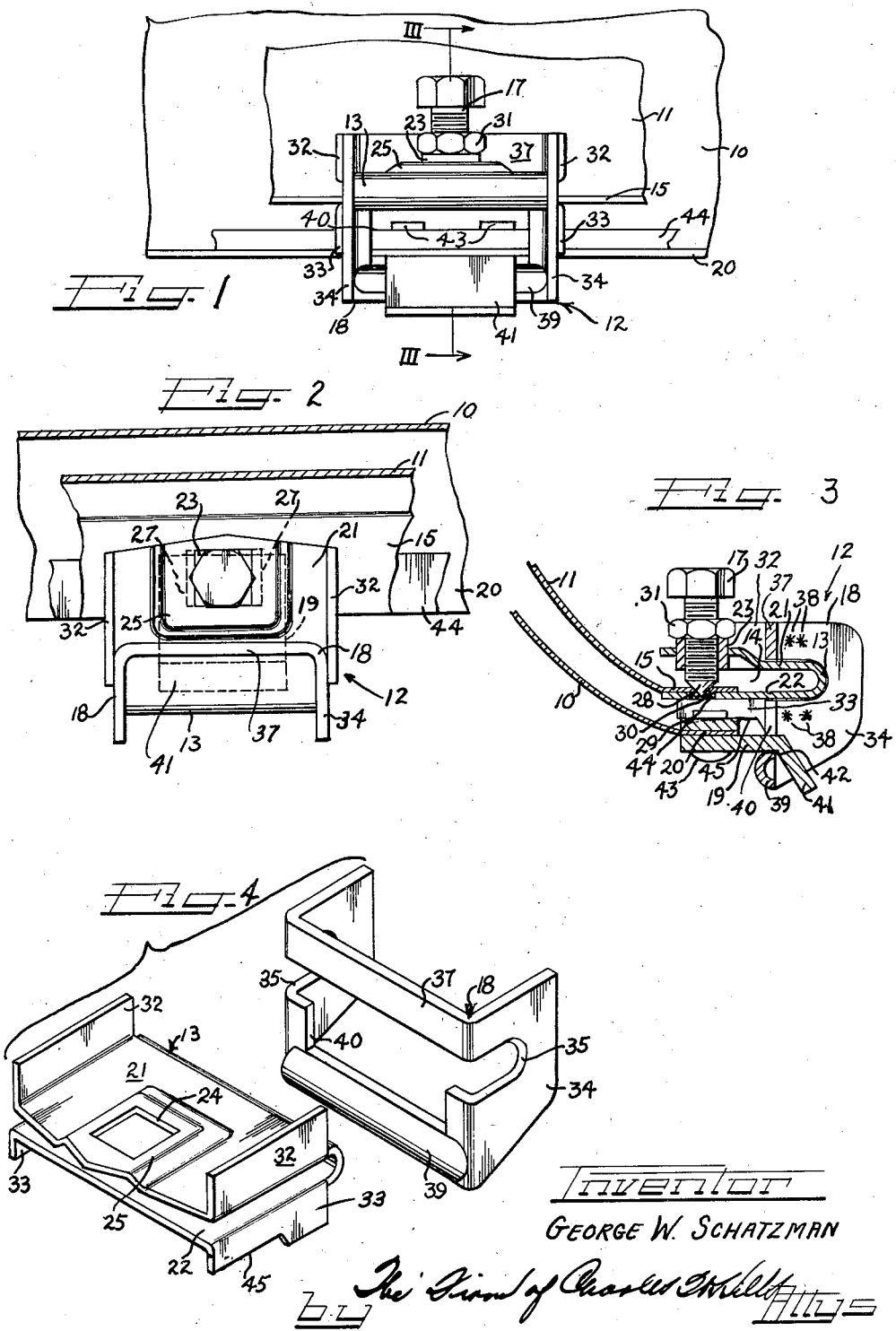

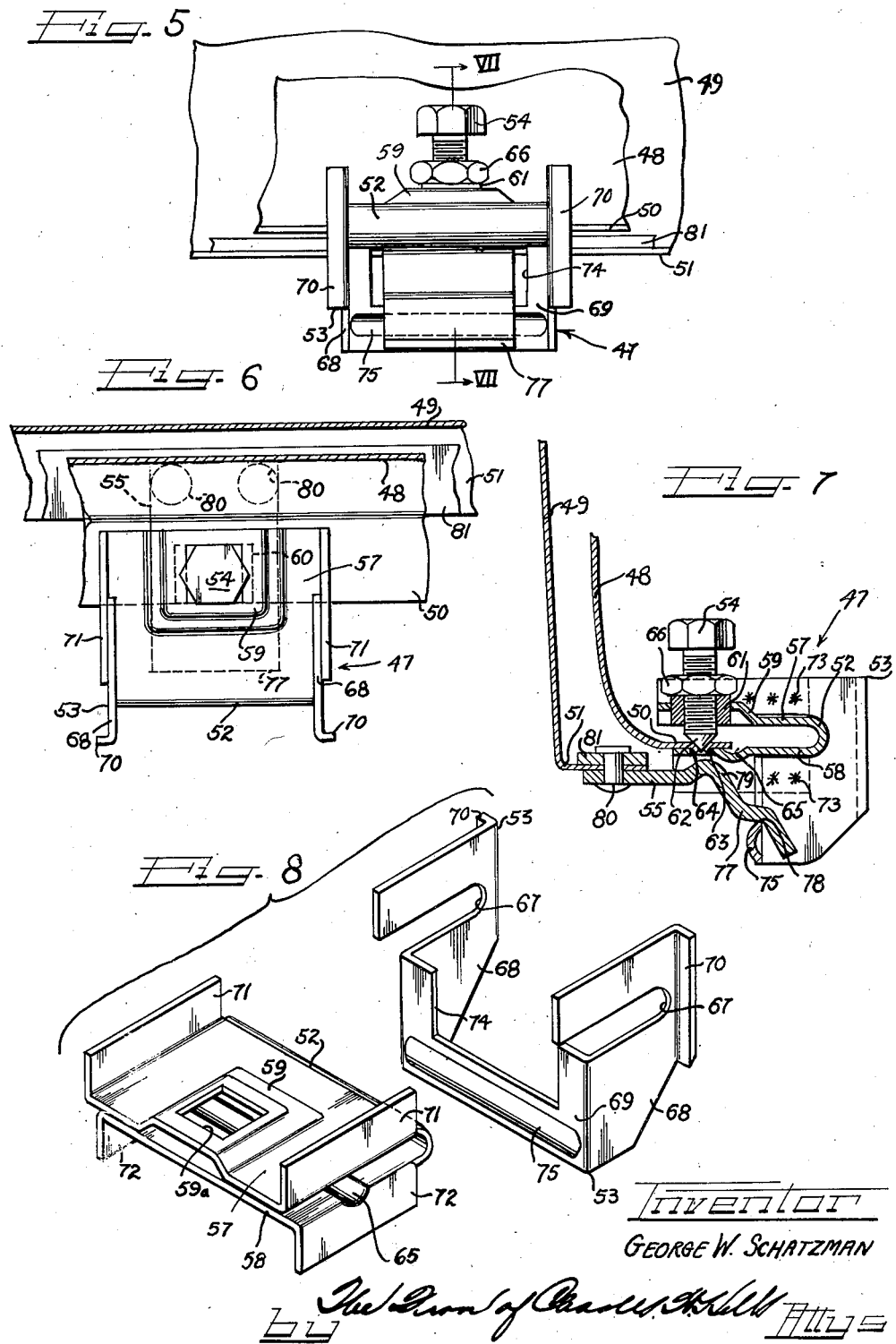

2,557,146

UNITED STATES PATENT OFFICE 2,557,146

FENDER AND FENDER SHIELD ASSEMBLY AND MOUNTING AND SUPPORTING MEANS THEREFOR

George W. Schatzman, Detroit, Mich., assignor to Houdaille-Hershey Corporation, Detroit, Mich., a corporation of Michigan Application September 9, 1946, Serial No. 695,759

15 Claims. (Cl. 280—153)

1

This invention relates to a fender and fender shield construction, and more particularly to novel means for mounting and supporting fender shields in closing relation to the wheel access openings customarily provided in the fenders.

In the vehicle industry, and particularly in the automobile industry, various means have been utilized to improve the appearance of vehicle fenders. Usually a fender is provided with an opening which affords access to the vehicle wheel, and which permits the ready removal or replacement of the wheel in an axial direction. Since this opening inherently presents an unattractive outward appearance, detachable fender shields have been employed to substantially cover the opening.

As the term "fender shields" shall hereinafter be employed, it refers to any member which is adapted to be secured to a fender or other portion of a vehicle body for the purpose of covering the opening in the fender or vehicle body which is provided for access to or removal of the vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly away from the principal body portion of the vehicle.

An important object of the present invention is to provide a novel fender and fender shield assembly in which the fender shield is mounted upon and supported in closing relation to the access opening of the fender in a novel manner.

Another object of the invention is to provide novel means for readily and quickly attaching and detaching a fender shield from the vehicle fender.

Another object of the invention is to provide novel means for mounting and supporting a fender shield detachably in closing relation to the wheel access opening of a fender, such means being simply and easily demountably carried by the fender and being adapted for ready assembly or detachment of the fender shield, while nevertheless positively and reliably supporting the fender shield in the assembly.

A still further object of the invention is to provide an improved bracket structure adapted to be secured as an optional accessory to an existing fender for enabling assembly of a fender shield with the fender.

Yet another object of the invention is to pro-

2 vide a novel adapted bracket for mounting a fender shield upon a fender which was not originally equipped for receiving a fender shield.

Still another object of the invention is to provide a simple and effective self-attaching fender shield supporting bracket structure adapted to be made simply and economically from an assembly of sheet metal die formed components so interrelated as to be capable of withstanding any of the structural or operating stresses and strains to which it may be subjected in the course of assembly or in service.

It is also an object of the invention to provide a novel fender shield mounting and supporting bracket which is adapted to be applied or removed from a fender by simple manipulation of a set screw.

Other objects, features and advantages of the present invention will become readily apparent from the following detailed description of certain preferred embodiments thereof taken in conjunction with the accompanying two sheets of drawings in which:

Figure 1 is a fragmentary inside elevational view of a fender and fender shield assembly showing a mounting and supporting bracket assembly embodying the features of the present invention;

Figure 2 is a sectional plan view of the structure shown in Figure 1;

Figure 3 is a vertical sectional view taken substantially along the line III—III of Figure 1;

Figure 4 is an exploded assembly view of certain of the mounting and supporting bracket components;

Figure 5 is a fragmentary inside elevational view of a fender and fender shield assembly showing a modified form of fender shield mounting and supporting bracket structure according to the present invention;

Figure 6 is a sectional top plan view of the structure shown in Figure 5;

Figure 7 is a vertical sectional detail view taken substantially along the line VII—VII of Figure 5; and Figure 8 is an exploded assembly view of certain components of the mounting and supporting bracket of the form of the invention shown in Figure 5.

Having more particular reference to the drawings, and more especially to Figures 1 to 4 thereof, the fender shield 10 is adapted to be mounted and supported upon a fender 11 in ornamental closing relation to the customary wheel access opening therein (not shown) at least in part by a mounting and supporting bracket structure generally identified at 12.

According to the present invention, the mounting and supporting bracket structure 12 is of novel construction adapting it to be applied optionally and selectively to the fender 11 where the fender may not have been originally equipped to support a fender shield. To this end, the bracket 12 comprises an attaching member 13 providing a narrow, relatively deep slot-like mouth 14 freely receptive of an inwardly extending horizontal reinforcing flange 15 at the lower edge of the fender 11 to which the attaching member 13 is secured by means such as a set screw 17. A reinforcing and hanger member 18 is assembled with the attaching member 13 and is equipped to receive and support an inwardly projecting connecting bracket or finger 19 carried by a lower edge reinforcing flange 20 on the fender shield 10.

By preference, the attaching member 13 is formed from an elongated blank of suitable gauge of sheet metal and appropriate size bent upon itself into substantially C-shape to provide opposed upper and lower panel legs or arms 21 and 22 defining the flange-receiving mouth 14. Herein, the arms 21 and 22 are preferably disposed in substantially parallel relation and substantially coextensive.

To accommodate the set screw 17, the upper arm 21 is provided with a hardened stationary nut insert 23 formed with a square head nonrotatably fitting in a complementary aperture 24 therefor adjacent to the outer edge of the arm and centrally thereof in a portion offset upwardly as shown at 25 from the principal plane of the arm 21 for accommodating lateral retaining flanges 27 (Fig. 2) at the inner end of the nut insert 23 clear of the mouth 14. In addition to its nut-flange clearance function, the offset 25 serves to reinforce the panel forming the bracket arm 21.

The set screw 17 is of a length to extend freely above the nut insert 23 for ready access to the head thereof by means of a simple wrench and to project downwardly beyond the nut insert for registration of a tapered piercing tip 28 within a clearance and interlocking hole 29 of smaller diameter than the shank of the set screw and disposed coaxially therewith in the lower arm 22 of the attaching member. With this arrangement, when the set screw 17 is driven tightly against the fender flange 15 interposed between the piercing tip 28 and the lower arm 22 of the attaching member 30 serving as an anvil, the tip will puncture the flange and about the puncture drive a burr flange 30 into the reduced diameter clearance aperture 29. As a result, the flange 30 is driven tightly against the lower arm 22 about the rim of the aperture 29 by the shoulder of the tapered tip 28 and this interlockingly engages it within the aperture whereby to retain the bracket fixedly upon the fender shield flange 15. A lock nut 31 is provided for securing the set screw against unintentional loosening.

Along each side of the upper attaching member arm 21 is formed an upstanding, preferably right angular reinforcing flange 32. Similarly, along each side of the lower arm 22 of the attaching member is formed a downwardly extending right angular reinforcing flange 33. The flanges 32 and 33 at each side of the attaching member 13 are preferably coplanar and adapted to engage in face-to-face relationship with respective side wing flanges 34 of the reinforcing and hanger member 18 when the attaching member 13 is assembled within outwardly opening slots 35 provided for such purpose in the member 18.

The reinforcing and hanger member 18 is preferably made from sheet metal appropriately formed by a die stamping process into substantially U-shape, with the wing flanges 34 spaced apart with respect to their outer faces a distance equal to the spacing between the inner faces of the set of flanges 32 and 33 of the attaching member 13. As best seen in Figs. 2 and 3, the wing portions of the slots 35 are of such depth that when the attaching member 13 is fully received within the slots, an integral connecting bar 37 across the top of the slot closely approaches the offset 25 and thereby transversely overlies the upper attaching member arm 21 at an intermediate point while the edges defining the slots 35 in the wings 34 oppose the respective arms 21 and 22 of the attaching member.

In addition, the flanges 32 and 33 are preferably permanently secured to the wing flanges 34 as by means of spot welding. Thereby, the attaching member 13 and the reinforcing and hanger member 18 are united in a fixed assembly wherein the member 18 reinforces the attaching member 13 in cooperation with the flanges 32 and 33 against spreading apart or bending to any substantial extent as a reaction to the tightening thrust of the set screw 17 in assembling the bracket upon the fender flange 15. At the same time, the reinforcing and hanger member 18 is supported by the attaching member 13 with a horizontal fender shield supporting bar 39 as a hanger below the attaching member arm 22.

The hanger bar 39 is formed as an integral part of the member 18 spaced below the slots 35 by substantial clearance cut out 40 and extending between the lower extremities of the wing flanges 34 to receive the fender shield attaching finger 19 thereon. In order to rigidify and strengthen the hanger bar 39, it may be pressed into bead form substantially as shown.

For effecting an interlocking relationship of the connecting finger 19 and the hanger bar 39, the finger is preferably formed with a hook terminal 41 formed in the present instance as an obliquely turned down terminal portion. The vertical distance of the tip of the hook terminal 41 from the top plane of its supporting structure is preferably greater than the clearance cut-out 40 so that in applying or removing the fender shield 10, it must be tilted outwardly away from the fender 11 to clear the terminal hook 41 by tilting the latter up toward the horizontal. Furthermore, the spacing of the groove provided between the body of the finger 19 and the terminal hook 41, as indicated at 42, to the point of attachment of the finger to the flange 20 of the fender shield is preferably such that interengagement of the upper edge of the hanger bar 39 in the groove 42 causes the fender shield to be drawn and held snugly against the fender when in fully assembled relationship.

As best seen in Fig. 3, the relationship of the fender shield 10 to the fender 11, is such that the reinforcing flange 20 underlies the fender reinforcing flange 15 in asssembly. Accordingly, the attaching finger 19 is relatively short and is secured to the under side of the fender shield reinforcing flange 20 as by means of rivets 43.

A reinforcing bar 44 carried by the upper side of the flange 20 is adapted, in the fully assembled relationship of the fender shield with the fender to engage against the lower edges of the flanges 33 which may be slightly cut back, as indicated at 45, to afford clearance for this purpose. With this arrangement, after the fender shield has been swung up about the fulcrum provided by the hanger bar 39 into fully assembled relationship, the engagement of the reinforcing bar 44 with the lower edges of the flanges 33 assures that the connecting finger 19 will bear snugly at the groove 42 upon the hanger bar 39. Thereby the assembly will be thoroughly rattle proof. If preferred, the attaching finger 19 may be initially bent down or biased slightly so that in the fully assembled position it is sprung between the hanger bar 39 and the engagement effected by the reinforcing bar 44 with the flanges 33 to implement the rattle proofing in the assembled condition.

In a modified form of the invention as shown in Figures 5 to 8, inclusive, a mounting and supporting bracket structure 47 is provided for a slightly modified type of fender and fender shield assembly including a fender 48 and a fender shield 49 extending substantially vertically, and with a lower edge reinforcing flange 50 on the fender inset relative to a right angular lower reinforcing flange 51 on the fender shield.

In all major respects the bracket 47 is like the bracket 12 comprising a substantially C-shaped attachment member 52 assembled with a reinforcing and hanger member 53 and carrying a set screw 54, the hanger member being interengageable with a bracket arm or finger 55 carried by the fender shield flange 51.

The attachment member 52 is adapted to be formed from suitable gauge sheet metal bent into the generally C-shape to provide parallel upper and lower panel arms 57 and 58, respectively, the upper of which preferably projects outwardly slightly beyond the lower arm but being otherwise substantially coextensive. The upper arm 57 has adjacent to the center of its outer portion an upward offset 59 receptive of the retaining flanges 60 of a stationary nut 61 extending up non-rotatably through an aperture 59a. The set screw 54 is threaded through the nut 61 to drive its taper pointed piercing tip 62 through the fender flange 50 to strike out a burr flange 63 and clampingly lock the same within an interlock hole 64 in the lower arm 58. A transverse reinforcing bead 65 may be formed across the lower arm 58 inwardly from the clearance and interlock hole 64. A lock nut 66 holds the set screw 54 against unintentional loosening.

The attachment member 52 is adapted to be interengageably assembled with the reinforcing and hanger member 53 by reception within appropriate complementary slots 67 formed in wing flanges 68 extending integrally inwardly from a front panel 69. The member 53 may also be made from sheet metal so that it can be economically manufactured by a die stamping or shaping process of manufacture. Outstanding right angular reinforcing flanges 70 may be provided at the inner or free margins of the wing flanges 68.

To maintain the attachment member 52 and the reinforcing hanger member 53 assembled and in mutually reinforcing and supporting relation, coplanar oppositely extending right angularly reinforcing flanges 71 and 72 on the upper and lower arm 57 and 58, respectively, of the attaching member are adapted to be secured as by means of spot welding 73 to the outside faces of the wing flanges 58. When thus assembled, the attaching member arms 57 and 58 are held substantially against spreading under the thrust influence of the tightened set screw 54, the upper portions of the wing flanges 68 opposingly overlying the upper arm 57 right angularly and extending outwardly substantially beyond the inner end of the offset reinforcement 59 and thereby assuring a substantially rigid and non-buckling, non-distorting assembly.

Below the assembly slots 67, the connecting panel or web 69 is cut out as indicated at 74 to afford assembly clearance for the bracket finger 55 which is adapted to engage upon the lower edge of the cutout serving as a hanger bar which is preferably reinforced by means of a pressed horizontal bead 75. The vertical dimension of the cutout 74 is preferably less than the downward extent of a terminal hook flange 77 on the finger 55. Thereby in assembling the fender shield 49 with the fender 48, the fender shield is held in an outwardly tilted position so that the terminal flange 77 can be projected in a generally horizontal position through the opening 74. Then, when the fender shield 49 is swung up into vertical position, a seating shoulder 78 formed intermediate the ends of the terminal flange 77 will engage upon the upper edge of the hanger bar. For purpose of reinforcement the juncture of the terminal flange 77 with the body of the finger 55 is preferably formed as a ridge or bead 79.

Attachment of the finger 55 to the fender shield flange 51 is effected in any suitable manner, as for example by means of a pair of rivets 80 which extend through the fender shield flange 51 and a reinforcing bar 81 carried thereby and clamp the outer end portion of the finger 55 to the under side of the flange 51.

From the foregoing it will be apparent that, in both forms of the invention, the mounting and supporting bracket structure is adapted to be secured at will to any fender having a proper marginal reinforcing flange. Attachment of the bracket to such flange can be accomplished by the use of a simple wrench to turn the single set screw of the bracket and drive the piercing end thereof into thorough securing relation to the fender flange. A single set screw suffices because of the centered suspension of the fender-carried bracket finger under the mounting and supporting bracket by the hanger bar thereof. When a fender is to be replaced, the bracket structure can be readily removed and reused on another fender.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a bracket structure of the character described, a substantially C-shaped metal attachment member providing a mouth adapted to receive the reinforcing flange of a fender therein, means carried by said attachment member for securing the same to said flange, and a reinforcing member secured to the opposite arms of said attachment member and having means for engagement by a fender shield support, said reinforcing member and said attachment member having interengaging flanges permanently secured together to maintain the members in the assembled condition thereof.

2. In combination in a bracket structure for attachment to a fender and adapted for supporting a fender shield in assembly with the fender, a sheet metal attachment member comprising a one piece body substantially doubled over to provide a pair of opposed spaced arms defining therebetween a mouth receptive of a reinforcing flange on the fender shield, a stationary nut carried by one of said arms, a piercing-tip set screw threaded through said nut and being adapted to be driven toward the opposite arm of the attaching member, said opposite arm having a clearance and interlocking aperture therein of smaller diameter than the set screw and adapted to have the piercing tip project thereinto for driving a burr flange of the fender flange interlockingly into the aperture, and a reinforcing structure holding said arms substantially against spreading from screw thrust when the set screw is tightened.

3. In combination in a bracket structure for attachment to a fender and adapted for supporting a fender shield in assembly with the fender, a sheet metal attachment member comprising a one-piece body substantially doubled over to provide a pair of opposed spaced arms defining therebetween a mouth receptive of a reinforcing flange on the fender shield, a stationary nut carried by one of said arms, a piercing-tip set screw threaded through said nut and being adapted to be driven toward the opposite arm of the attachment member, said opposite arm having a clearance and interlocking aperture therein of smaller diameter than the set screw and adapted to have the piercing tip project thereinto for driving a burr flange of the fender flange interlockingly into the aperture, and a reinforcing structure holding said arms substantially against screw thrust spreading when the set screw is tightened, said reinforcing structure comprising a substantially U-shaped sheet metal member having wing flanges slotted and with the attaching member assembled therein, said U-shaped member having a cutout web below said apertured arm of the attachment member and providing a hanger bar to be engaged by a supporting finger on the fender shield.

4. In combination in a bracket structure of the character described, an attaching member adapted to be secured to a flange on a fender, and a reinforcing and bracket member carried by said attaching member and comprising a substantially U-shaped sheet metal structure having a pair of wing flanges reinforcingly related to said attachment member, and a connecting web between said wing flanges formed with a hanger bar spaced below said attaching member for receiving a supporting finger on a fender shield.

5. In a fender and fender shield assembly wherein the fender has an access opening adapted to be closed ornamentally by the fender shield, the fender and fender shield both having reinforcing flanges adapted in the assembly to be disposed in superposed spaced relation, means for mounting and supporting the fender shield including bracket structure carried by the fender flange and having a hanger bar disposed therebelow and inwardly therefrom, a supporting finger carried by the fender shield flange and having a hook portion adapted to engage over said hanger bar, and means on said bracket structure engageable with the flange of the fender shield for holding the supporting finger in rattle free relation on said hanger bar in the assembled condition of the fender shield and fender, said finger having an initial distorted spring bias and in said assembled condition being sprung to implement said rattle free relation.

6. In connecting and supporting means for a fender and fender shield assembly wherein the fender has an access opening adapted to be closed ornamentally by the fender shield, the fender and fender shield both having reinforcing flanges on the lower portion thereof adjacent an end of the access opening adapted in the assembly to be disposed in superposed spaced relation, means for mounting and supporting the fender shield including bracket structure adapted to be carried by the fender flange and having a hanger bar arranged to be disposed below and inwardly from the fender flange, a supporting finger adapted to be carried by the fender shield flange and having a hook portion adapted to engage over said hanger bar, and means engageable with the flange structure of the fender shield for holding the supporting finger in rattle free relation on said hanger bar in the assembled condition of the fender shield and fender, said means comprising flange structure on said bracket.

7. In combination in a bracket structure for attachment to a fender and adapted for supporting a fender shield in assembly with the fender, a sheet metal attachment member comprising a one-piece body substantially doubled over to provide a pair of opposed spaced arms defining therebetween a mouth receptive of a reinforcing flange on the fender shield, means carried by one of said arms and cooperable with the other arm for securing the fender flange therebetween, and a reinforcing U-shaped sheet metal member having wing flanges slotted and with the attaching member assembled therein and including means to be engaged by a fender shield structure to support the fender shield.

8. In combination in a bracket structure for attachment to a fender and adapted for supporting a fender shield assembly with the fender, an attachment member of a shape to provide a mouth receptive of a reinforcing flange on the fender shield, means for securing the fender shield flange in said mouth, and a reinforcing and fender shield supporting member internested with said attachment member and having a portion for engagement by a structure on the fender shield to be supported by the bracket, said internested members having parallel flanges in face to face relation and secured together to hold the members in assembly.

9. In combination in a fender and fender shield assembly, a fender having an inwardly extending horizontal flange, a fender shield adapted to cooperate in assembly with the fender and also having an inwardly extending flange disposed in the assembly at a lower elevation than the fender flange, a bracket structure having a mouth within which the fender flange is received and including means for clamping the fender flange against one side of said mouth, the bracket structure including a hanger bar disposed rearwardly from the fender flange and at a lower elevation than the fender shield flange, and an engagement finger secured to the fender shield flange and having inwardly and downwardly projecting portions defining a hook-line structure engaged over and inwardly of the hanger bar and thereby connecting the fender shield to said bracket.

10. In combination in a fender and fender shield assembly, a fender having an inwardly extending flange, a fender shield cooperating in assembly with the fender and having an inwardly extending flange disposed generally parallel to the fender flange and projecting inwardly substantially beyond the plane of the outer face of the fender, a bracket structure having a mouth within which the fender flange is received and including means for clamping the fender flange against one side of said mouth, a supporting bar on said bracket structure disposed rearwardly from the fender flange clear of the fender shield flange, but adjacent to the fender shield flange, and an engagement finger secured to the fender shield flange and projecting inwardly into engagement upon the bracket bar to thereby connect the fender shield to the bracket.

11. In fender shield supporting means, a bracket assembly adapted to be mounted on an inwardly directed marginal flange of a vehicle fender to receive an engagement finger projecting inwardly from the marginal flange of a fender shield and which fender shield flange in assembly projects inwardly beyond the outer face plane of the fender wall, said assembly including structure defining an outwardly opening mouth receptive of the fender flange, means coacting with said structure to secure the fender flange in said mouth, and supporting structure carried by said mouth-defining structure and comprising a generally horizontal bar disposed substantially inwardly relative to said securing means and said mouth to clear the fender shield flange, the bar being located to receive the fender shield finger in supported relation thereon.

12. In fender shield supporting means, a bracket assembly adapted to be mounted on an inwardly directed marginal flange of a fender, said assembly including structure defining an outwardly opening mouth receptive of the fender flange, means coacting with said structure to secure the fender flange in said mouth, supporting structure carried by said mouth-defining structure and comprising a generally horizontal bar disposed substantially inwardly relative to said securing means and said mouth and adapted to clear the inwardly directed marginal flange of a fender shield to be assembled with the fender, and a generally horizontal supporting finger adapted to be secured fixedly to and project inwardly from the fender shield flange to engage in fender shield supporting and retaining relation upon said bar.

13. In a fender shield supporting bracket structure adapted to be secured to a marginal flange of a fender, a generally C-shaped one-piece sheet metal clamp member providing a mouth receptive of the fender flange, a hardened nut insert carried by one arm of the bracket, a taper tipped piercing set screw threaded through said nut insert and adapted to engage and pierce the fender flange by driving it against the opposite arm of the bracket serving as an anvil, said opposite arm having a clearance and interlock hole for receiving the screw tip and a burr flange interlockingly pressed into the hole by said tip.

14. In combination in a bracket structure of the character described, a substantially C-shaped attachment member having a back and opposing legs connected by the back and defining a mouth therebetween adapted to receive a flange on a fender therein, a separately formed substantially U-shaped reinforcing member having a web and opposed legs connected by the web, said web having a transverse slot therethrough and through the adjacent portions of the legs, the back of said attachment member and the adjacent portions of the legs thereof being internestingly engaged within said slot so that the reinforcing member acts to hold the C-shaped member against spreading apart, one of said members having means thereon for engagement by an attachment structure of a fender shield to be mounted on the fender.

15. In combination in means for mounting and supporting a fender shield in closing relation to a wheel access opening in a fender having an inwardly extending reinforcing flange adjacent to said opening, a sheet metal attachment member having spaced legs defining a mouth between the adjacent faces thereof adapted to receive said reinforcing flange therein, means carried by one of the legs of the attachment member for securing the fender flange in said mouth between said legs, said legs being liable to spread apart as a result of functioning of the securing means, a reinforcing and hanger member carried by the attachment member and having spaced apart leg portions engaging the remote faces of the legs of the attachment member to prevent spreading of said attachment member legs, said reinforcing and hanger member having a hanger portion extending beyond the attachment member and in a position to be accessible from the outer side of the fender, and a fender shield supporting and connecting member adapted to be secured to the margin of the fender shield and comprising a structure to project inwardly from the fender shield into engagement with said hanger portions.

GEORGE W. SCHATZMAN.

REFERENCES CITED

The following references are of record in the file of this patent:

UNITED STATES PATENTS

| Number | Name | Date |
| --- | --- | --- |
| 1,233,223 | Hachmann | July 10, 1917 |
| 1,946,967 | Douglas | Feb. 13, 1934 |
| 2,239,373 | Schatzman et al. | Apr. 22, 1941 |
| 2,278,121 | Berluti | Mar. 31, 1942 |

FOREIGN PATENTS

| Number | Country | Date |
| --- | --- | --- |
| 833,177 | France | July 18, 1938 |